(12) United States Patent
Baudy

(10) Patent No.: US 9,636,734 B2
(45) Date of Patent: May 2, 2017

(54) TUBE NOTCHING METHOD AND ASSOCIATED NOTCHING MACHINE

(71) Applicant: NUMALLIANCE, Saint Michel sur Meurthe (FR)

(72) Inventor: Sebastien Baudy, Chatillon en Vendelais (FR)

(73) Assignee: NUMALLIANCE, Saint Michel sur Meurthe (FR)

( * ) Notice: Subject to any disclaimer, the term of this patent is extended or adjusted under 35 U.S.C. 154(b) by 252 days.

(21) Appl. No.: 14/408,271

(22) PCT Filed: Jun. 12, 2013

(86) PCT No.: PCT/FR2013/051373
§ 371 (c)(1),
(2) Date: Dec. 15, 2014

(87) PCT Pub. No.: WO2013/186490
PCT Pub. Date: Dec. 19, 2013

(65) Prior Publication Data
US 2015/0114072 A1    Apr. 30, 2015

(30) Foreign Application Priority Data
Jun. 15, 2012  (FR) ...................................... 12 55602

(51) Int. Cl.
*B21D 17/02*     (2006.01)
*B21K 23/00*     (2006.01)
(Continued)

(52) U.S. Cl.
CPC ................ *B21D 17/02* (2013.01); *B21J 5/12* (2013.01); *B21K 23/00* (2013.01); *B60N 2/4817* (2013.01)

(58) Field of Classification Search
CPC ........ B21D 17/00; B21D 17/02; B21D 22/02; B21D 22/025; B21D 22/04; B21D 22/06;
(Continued)

(56) References Cited

U.S. PATENT DOCUMENTS 2,697,953 A * 12/1954 Chapman ............... B21D 22/04
                                                  72/356
4,582,259 A *  4/1986 Hoover .................. B21D 28/28
                                                  72/335
(Continued)

FOREIGN PATENT DOCUMENTS

FR    2816857 A1    5/2002
FR    2842752 A1    1/2004
JP    59193731 A   11/1984

*Primary Examiner* — Moshe Wilensky
*Assistant Examiner* — Pradeep C Battula
(74) *Attorney, Agent, or Firm* — Andrew W. Chu; Craft Chu PLLC

(57) ABSTRACT

The method for producing at least one notch in an outer wall of a tube includes guiding a first punch being made of a preforming tooth, causing the preforming tooth to penetrate through the wall of the tube until a protuberance is formed, positioning a solid cylindrical mandrel inside the tube. Then, the method includes guiding a second punch with a punching tooth, a leading end of the punching tooth having a shape complementary to a shape of the notch to be made in the wall of the tube, positioning a punching mandrel inside the tube, and having a groove suitable for containing the upset material. The invention can be used for notching headrests for the seats of a motor vehicle.

6 Claims, 2 Drawing Sheets

(51) Int. Cl.
*B21J 5/12* (2006.01)
*B60N 2/48* (2006.01)

(58) Field of Classification Search
CPC .......... B21D 53/88; B21J 5/12; B60N 2/4817; B21K 23/00
See application file for complete search history.

(56) References Cited

U.S. PATENT DOCUMENTS

| | | | | |
|---|---|---|---|---|
| 6,170,313 | B1 * | 1/2001 | Vasseur | B21D 22/04 72/370.21 |
| 6,505,493 | B2 * | 1/2003 | Nakane | B21D 17/02 72/370.04 |
| 7,121,626 | B2 * | 10/2006 | Akehi | B60N 2/4817 297/410 |
| 8,356,863 | B2 * | 1/2013 | Arcidiacone | B21D 17/02 297/391 |
| 2002/0060489 | A1 * | 5/2002 | Richard | B21D 22/04 297/391 |
| 2011/0031795 | A1 * | 2/2011 | Arcidiacone | B21D 17/02 29/428 |

* cited by examiner

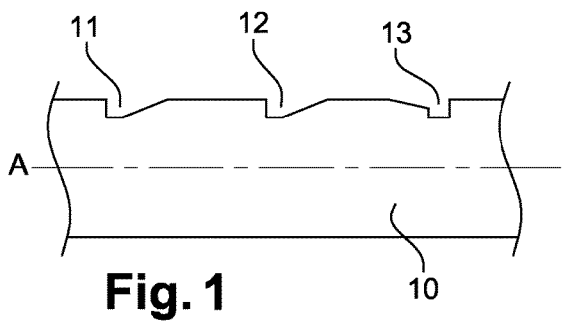
Fig. 1
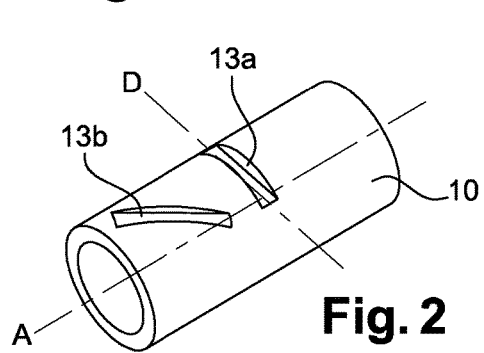
Fig. 2
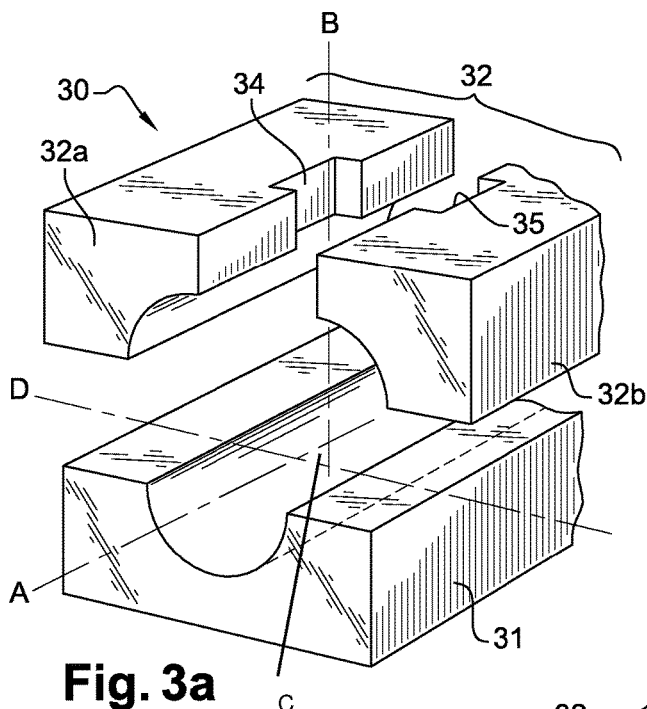
Fig. 3a
Fig. 3b
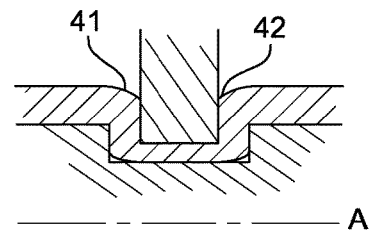
Fig. 4
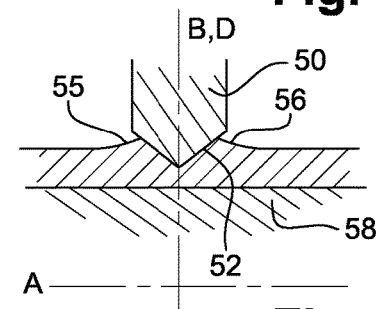
Fig. 5
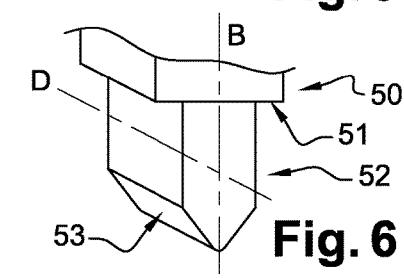
Fig. 6
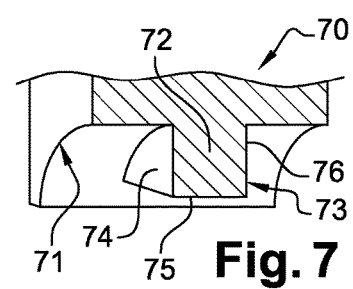
Fig. 7
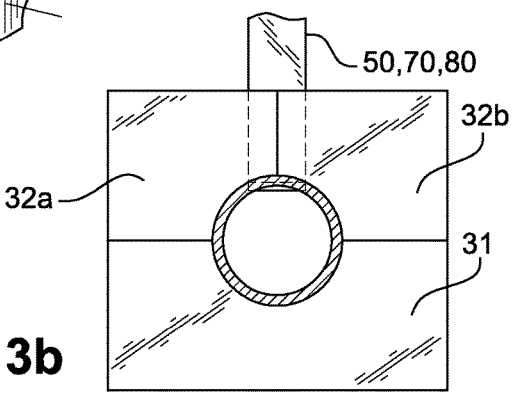

TUBE NOTCHING METHOD AND ASSOCIATED NOTCHING MACHINE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to a method and a machine for notching a tube such as a headrest frame tube of a seat of a motor vehicle.

The invention applies in particular, but not restrictively, to height-adjustable headrests the frame of which consists of two parallel legs, at least one of which includes a plurality of notches, each defining a height-adjustment position of the headrest and an end notch forming a positive stop opposing an involuntary extraction of the headrest out of its guides when it is pulled upwards, except after a voluntary unlocking. In order to retain the headrest, these notches cooperate with latches integrated into guiding sleeves provided at the top of the seat back.

2. Description of Related Art Including Information Disclosed Under 37 CFR 1.97 and 37 CFR 1.98.

Different notch profiles are shown in FIG. 1. Some notches 11, 12 comprise a steep locking flank and a sloping flank, other notches, for example, the end notch 13 shown in detail in FIG. 2, comprise two steep locking flanks and a flat bottom.

The locking flanks must be as steep as possible, even on slopes (or undercuts), they must form an angle as sharp as possible with the outer surface of the wall of the tube, they must be as less wide as possible and as deep as possible, in order to guarantee the impossibility of inadvertently unlock the headrest.

On solid metal rods, these notches are easy to be produced, regardless of their profile, by machining or cold deformation (stamping). But in order to reduce the weight of the headrest frames, one seeks to make tubular frames and producing a notch on a tube by means of transverse deep-drawing inevitably causes a sagging 41, 42 of the outer wall of the tube (FIG. 4). This deformation does not permit to obtain the desired sharp angles for the transverse flanks of the notches in order to make impossible an inadvertent unlocking of the headrest. This deformation in addition leads to a local increase of the diameter of the tube, which disturbs the sliding of the tube in the guiding sleeve.

Document FR 2 842 752 discloses a method and a notching press for producing notches with transverse flanks on a tube. The use of a specific mandrel inside the tube, into contact with the wall of the tube, permits the material hammered by the punch to move to the inside of the tube, which prevents the local increase of the diameter of the tube. This solution permits to produce notches with one or two transverse flanks, even small-width notches. But this technical solution does not permit to obtain the desired sharp angles for the transverse flanks of the notches; neither does it permit to produce notches with a depth larger than the thickness of the wall of the tube.

FR 2 816 857 discloses a method and a notching punch permitting to produce notches with one or two transverse flanks on the tube. The use of a punch in a direction inclined by about 30° permits steep flanks with a sharp edge. But, due to the inclination of the punch, the width of a notch is necessarily much larger than the width of the punching tooth and it is not possible in practice to make small-width flanks, including namely notches with double transverse flanks.

SUMMARY OF THE INVENTION

The invention provides a novel tube notching solution permitting to produce notches with one or two transverse flanks of higher quality than the previous methods described above. More specifically, the invention provides a novel method during which is produced, in an outer wall of a tube extending along a longitudinal axis, through guiding punches in a working plane and in a working direction concurrent with the longitudinal axis of the tube, at least one notch comprising at least one locking flank.

The method according to the invention is characterized in that the following steps are performed:

ST1: a first punch is guided in the working direction, a preforming tooth of the first punch extending from one end of the first punch and parallel to the working plane, an intersection of a leading end of the preforming tooth with the working plane forming a straight line, and an intersection of said leading end of the preforming tooth with a plane parallel to the longitudinal axis of the tube forming a convex curve, and onto the first punch is exerted a preforming force capable of causing the preforming tooth to penetrate into the wall of the tube until obtaining a protuberance of material on both sides of the leading end of the preforming tooth, a solid cylindrical mandrel being positioned inside the tube, then ST2: a second punch is guided in the working direction, a punching tooth of the second punch extending from one end of the second punch and parallel to the working plane, a leading end of the punching tooth having a shape complementary to the shape of the notch to be produced, and on the punch and in the working direction is exerted a punching force capable of causing the punching tooth to penetrate into the wall of the tube by a distance equal to the depth of the notch to be produced, a punching mandrel being positioned inside the tube, said punching mandrel having, near to a notching area, a groove adapted for containing a material displaced during the displacement of the second punch.

During step ST1, the metal of the wall of the tube, wall supported by the solid mandrel, is collected for forming protuberances of excess material on the edges of the tube on both sides of the preforming tooth. During step ST2, the excess material on the edges of the tube is carried along by the punching tooth, in order to form the notch. In other words, with respect to a known punching process comprising only step ST2, step ST1 of a method according to the invention permits to accumulate at the level of the area of intersection of the outer surface of the wall of the tube and the flank of the notch, material that will necessarily be carried along to the inside of the notch at the time of step ST2. The notch obtained thus forms a sharp angle with the outer surface of the wall of the tube, there is no local sagging of the edge of the tube. Furthermore, since the width of the notch being produced is equal to the width of the tooth of the second punch, it is possible to produce notches with a width as small as desired by choosing a tooth with a desired width.

Tests have also permitted to produce notches with a depth larger than the thickness of the wall of the tube.

It should be noted that, in the method according to the invention, the making of a protuberance is important for forming a notch including a flank with a sharp edge, but is not essential for making a flank for which the quality of the edge (sharp or rounded) is not important, for example for a flank inclined with respect to the working direction. Thus, for producing a notch including a flank with a sharp edge and a flank with any edge whatsoever, it is enough to form a single protuberance, at one side of the leading face of the preforming teeth.

The shape and the dimensions of the leading end of the punching tooth of the second punch are complementary to the shape and the dimensions of the notch to be produced. Thus, for a notch having an edge parallel to the working plane, a flat bottom and a flank inclined with respect to the working direction, the leading end of the punching tooth comprises in the same way a leading face connecting ends of a first side face parallel to the working plane and a second side face inclined with respect to the working plane. For a notch having two flanks parallel to the working plane and a flat bottom, the punching tooth comprises in the same way a leading face connecting ends of two side surfaces parallel to the working plane. Etc.

Also, the shape of the preforming tooth of the first punch used in a method according to the invention depends on the final shape of the notches to be produced. Thus, for example, in order to produce a notch with an asymmetrical shape having a flank parallel to the working plane and a flank inclined with respect to the working plane, it is possible to use a first punch having an asymmetrical preforming tooth, having a convex leading end such that the intersection of said leading end with the working plane forms a straight line and such that the intersection of the leading end with a plane parallel to the longitudinal axis of the tube and passing through the longitudinal axis of the tube forms an asymmetrical convex curve adapted to the shape of the desired notch, as will better be seen later in the examples.

According to one implementation of a method according to the invention, during the step ST2, a second punch is used, a height of the punching tooth of which is equal to the depth of the notch to be produced, and the end of which has a shape complementary to an outer shape of the wall of the tube to be notched, for example a shape of a hollow cylinder portion. Thus, during the step ST2, the punching tooth, which extends from the end of the punch, forms the flanks and the bottom of the notch, as will be best understood later, by "consuming" most of the material of the protuberances formed during the step ST1. And at the end of step ST2, the end of the second punch rests on the outer surface of the wall of the tube, in order to flatten the remainder of the protuberances and thereby calibrate the outer surface of the wall of the tube. The notch thus obtained has a locking flank parallel to the working plane.

According to another implementation of the method according to the invention, during the step ST2, a second punch is used, the height of the punching tooth of which is larger than the depth of the notch to be produced, then the following step ST3 is performed:

ST3: a third punch is guided in the working direction, the third punch comprising an end with a shape complementary to an outer shape of the wall of the tube to be notched, and on the third punch is exerted a calibration force, in order to push into the interior of the notch being formed the excess material on the outer surface of the tube in the vicinity of the edges of the notch formed during the step ST2.

Thus, during the step ST2, the punching tooth, which extends from the end of the punch, forms the notch, the flanks and bottom of the notch by "consuming" most of the material protuberances formed during the step ST2; on the other hand, the end of the second punch does not enter into contact with the outer wall of the tube, so that there remains a slight protuberance of the outer wall of the tube at the level of the flank of the notch. Then, during the step ST3, the end of the third punch closely matches the outer surface of the wall of the tube and flattens the slight projection on the outer surface of the wall of the tube. Since the third punch has no tooth, the inside of the notch is free at the time of the step ST3, so that the end of the third punch pushes inside the notch the remaining excess material on the outer wall of the tube: a notch with one or several undercut flanks, i.e. slightly inclined with respect to the working plane, is thus obtained.

The shape of the preforming tooth, and namely the shape of its leading end, is also optimized depending on the shape and the dimensions of the notch to be produced. For a symmetrical notch, for example a notch with two flanks parallel to the working plane, the leading face of the preforming tooth can have a convex shape such that the intersection of the leading face with a plane parallel to the longitudinal axis of the tube and parallel to the working direction forms a convex curve, for example:

a V-shaped curve formed of two segments, the intersection of two segments forming a sharp edge or a rounded edge having the shape of an arc of a circle, a parabola or a hyperbola, or a U-shaped curve, with sharp or rounded edges, or a parabola or a hyperbola.

The shape of the preforming tooth, and namely the shape of the leading face of the preforming tooth is optimized depending on the amount of material that one wishes to push back on both sides of the preforming tooth during the step ST1: it is thus optimized depending on the thickness of the tube, on the one hand, and the ease to push back the material, on the other hand. For example, the more the leading face is close to a peak (V-shaped curve formed of two straight half-lines, with a sharp or rounded edge, for example), the easier it is to push back the material on both sides of the leading face and the easier it is to obtain the desired amount of excess material. But, the more the leading face is close to a peak, the more the material is marked and remains marked on the wall of the bottom of the notch, at the level of the contact area of the preforming tooth with the metal of the tube. Thus, the shape of the leading face results from a trade-off.

The shape of the end of the second punch or of the third punch obviously depends on the outer shape of the wall of the tube to be notched: the shape of the end of the second punch, or of the third punch when there is a step ST3, should be complementary to the outer shape of the wall of the tube to be notched. Thus, in order to notch cylindrical tubes, the end of the second punch and/or that of the third punch has (have) a shape of a hollow cylinder portion.

The invention also relates to a machine for producing notches on a tube extending along a longitudinal axis, the machine comprising a punching tool comprising:

a means for immobilizing a tube to be notched, while leaving free access to a area to be notched on an outer wall of the tube, and a means for positioning in the vicinity of the area to be notched and for driving in translation in a working plane and in a working direction concurrent with the longitudinal axis of the tube, successively a first punch and then a second punch:

a preforming tooth of the first punch extending from one end of the first punch and parallel to the working plane, an intersection of a leading end of the preforming tooth with the working plane forming a straight line, and an intersection of said leading end of the preforming tooth with a plane parallel to the longitudinal axis of the tube forming a convex curve, and a punching tooth of the second punch extending from one end of the second punch and parallel to the working plane, a leading end of the punching tooth having a shape complementary to a shape of the notch to be produced.

The punching tool can also comprise means for positioning inside the tube to be notched successively a solid mandrel, then a mandrel with a groove.

According to a variant, in order to produce simultaneously several notches along one and the same tube, the means for positioning and driving the punches is adapted for:

positioning along the axis of a tube several first punches, each of which in the vicinity of an area to be notched, then driving simultaneously the first punches in translation in working directions parallel to each other, all of them concurrent with the longitudinal axis of the tube and perpendicular to the longitudinal axis of the tube, then positioning along the axis of a tube several second punches, each of which in the vicinity of an area to be notched, then drive simultaneously the second punches in translation in the working directions.

Also, the machine can include two punching tools, mounted in parallel, in order to permit to notch simultaneously the two parallel legs of U-shaped frames.

BRIEF DESCRIPTION OF THE DRAWINGS

The invention will be better understood, and further features and advantages of the invention will become clear when reading the following description of exemplary embodiments of a bending machine according to the invention. These examples are given by way of non-restrictive examples. The description should be read with reference to the attached drawings.

FIG. 1 is a partial schematic view of a notched tube of a headrest frame of a seat of a motor vehicle.

FIG. 2 is a partial detailed perspective view of a notched tube.

FIGS. 3a and 3b show a partial perspective view and a sectional view, respectively, of an embodiment of the means for positioning a machine according to the invention.

FIG. 4 shows a schematic view of the production of a notch according to the prior art.

FIG. 5 shows a schematic view of the carrying out of the step ST1 of a method according to the invention.

FIG. 6 shows a detailed schematic view of a tooth of a first punch used for carrying out the step ST1 of FIG. 5.

FIG. 7 is a perspective view of a second punch used in FIGS. 10a, 10b.

FIG. 8 is a perspective view of a second punch used in FIG. 11a.

Figure 8:
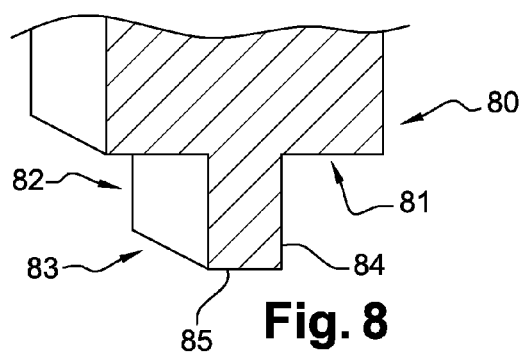

The reference marks in space are defined below; they are used throughout the description and the claims of the present patent application.

DETAILED DESCRIPTION OF THE DRAWINGS

In order to make FIGS. 4, 5, 10a-b, 11a-d are partial detail views of tubes and punches in the vicinity of the area to be notched. The punches and the tube are always represented in the working position relative to the other, so as to use the same axes or planes for defining the geometry of the punches and the tube.

The longitudinal axis A is the longitudinal axis of the tube to be notched. In all the examples shown, the axis A is horizontal for reasons of clarity.

The depth of a notch is measured in the working direction B. The working direction B is also the direction of driving the punches in translation. The working direction B is an axis concurrent with the longitudinal axis and is oriented towards the longitudinal axis of the tube.

The length of a notch to be produced is measured along a main axis D, perpendicular to the working direction B. The width of a notch is measured along an axis perpendicular to the direction B and perpendicular to the axis D. In the examples shown, the width of a notch is constant over the full height (or depth) of a notch. But according to further embodiments, the width of a notch can be varying according to the height of a notch; this is the case for example for a notch with a unique locking flank (parallel to the working surface) and a flank inclined with respect to the working plane. The working direction B and the longitudinal axis A define together a plane that corresponds to the plane of the sheet in FIGS. 1, 4-5, 10a-10b, 11a-11d. In the examples shown, the working direction B is perpendicular to the longitudinal axis A of the tube, facing downward towards the axis of the tube. But in further embodiments, the working direction B can also be inclined with respect to the axis of the tube.

The working direction B and the main axis D define together a working plane C, which plane is parallel to a locking flank of a notch to be produced, the working plane C is also parallel to at least one side face of the punching teeth of the punches the step ST2, which side face corresponds to the locking flank to be produced.

In the examples shown, the working plane C of the notches corresponds to a plane of symmetry of the notches to be produced and the teeth of the punches, perpendicular to the longitudinal axis of the tube. But any plane parallel to the direction B and parallel to a locking flank (e.g. the plane passing through the side face of the punches corresponding to the locking flank to be formed), and in particular when the tooth of a punch comprises no plane of symmetry.

In the examples shown also, the punches permit to produce notches with transverse locking flanks, i.e. notches perpendicular to the longitudinal axis A of the tube, such as the notch 13a, hence a transverse working plane C, perpendicular to the axis A of the tube. But the method according to the invention also permits to produce notches not perpendicular to the axis A of the tube, such as the notch 13b; to this end are used punches defined according to a working plane C defined by:

a working direction B not perpendicular to the axis A of the tube and a main axis D not perpendicular to the longitudinal axis A of the tube, or a working direction B perpendicular to the longitudinal axis A of the tube and a main axis D not perpendicular to the axis A of the tube (case of the notch 13b), or a working direction B not perpendicular to the axis A of the tube and a main axis D not perpendicular to the axis A of the tube.

DESCRIPTION OF EMBODIMENTS OF THE INVENTION

The method according to the invention permits to produce notches 11, 12 comprising a steep transverse flank with a sharp edge, and an inclined flank, or notches 13 comprising two steep transverse flanks with sharp edges. It obviously also permits to produce notches two inclined flanks.

In the examples shown in FIGS. 4 to 11 is represented in particular the production of notches with two transverse flanks with sharp edges.

The method according to the invention permits to produce, in an outer wall of a tube 10 extending along a longitudinal axis A, by guiding punches in a working plane C and in a working direction concurrent with the longitudinal axis B of a tube, at least one notch 11, 12, 13, 13a, 13b comprising at least one locking flank substantially parallel to the working plane, or undercut with respect to the working plane. The method according to the invention essentially comprises two steps:

ST1 (FIG. 5) a first punch 50 is guided in the working direction B, a preforming tooth 52 of the first punch extending from one end 51 of the first punch and parallel to the working plane C, an intersection of a leading end 53 of the preforming tooth 52 with the working plane forming a straight line, and an intersection of said leading end 53 of the preforming tooth 52 with a plane parallel to the longitudinal axis (and passing through the longitudinal axis in the examples shown) of the tube forming a convex curve, and on the first punch is exerted a preforming force adapted for causing the preforming tooth to penetrate into the wall of the tube until obtaining a protrusion 55, 56 on both sides of the leading end 53 of the preforming tooth 52, a solid cylindrical mandrel 58 being positioned inside the tube, then ST2 (10a-b, 11a-b): a second punch 70, 80 is guided in the working direction B, a punching teeth 72, 82 of the second punch extending from one end 71, 81 of the second punch and parallel to the working plane C, a leading end 73, 83 of the punching tooth 72, 82 having a shape complementary to a shape of the notch to be produced, and on the punch is exerted a punching force capable of causing the punching teeth to penetrate into the wall of the tube by a distance in the working direction equal to the depth of the notch to be produced, a punching mandrel 78 being positioned within the tube, said punching mandrel having in the vicinity of a notching area a groove 79 adapted for containing a material displaced during the displacement of the second punch.

During the step ST1 (FIG. 5), the first punch is driven in translation in the working direction B by a distance smaller than the thickness of the wall of the tube. The forming of the notch is initiated by forming of protuberances 55, 56 (excess material) on both sides of the preforming tooth of the first punch. The first punch should not be driven too deep, so as not to perforate the wall of the tube. The pushing down of the first punch is optimized according to the shape of the tooth of the first punch and the shape of the notch to be produced, so that the amount of material contained in the protuberances 55, 56 is equal to or slightly larger than the amount of material that is then driven by the punching tooth of the second punch during the step ST2.

The preforming tooth shown in front view in FIG. 5 is shown in perspective in FIG. 6. In this embodiment, the intersection of the leading end 53 of the preforming tooth 52 with the working plane C is a straight line substantially parallel to the axis D; and the intersection of the leading end 53 with a plane parallel to the longitudinal axis of the tube and parallel to the direction B (and therefore perpendicular to the axis D) forms a convex curve, such as a V-shaped curve comprised of two segments connected by a rounded edge having the form of an arc of circle with a radius from 0.1 to 1 mm.

During the step ST2, the second punch is driven in translation in the direction B over a distance equal to the height of the desired notch. The second punch forms the notch by carrying along the material contained in the protuberances. This results into notches in which the intersection of a flank with the outer surface of the tube forms a sharp edge. The punching tooth of the second punch has a leading end 73, 83 complementary to the shape of the notch to be produced: a first transverse side face 74, 84, a leading face 75, 85, and a second side face 76, 86 in the examples of the FIGS. 10a-b, 11a-b.

Figure 10A:
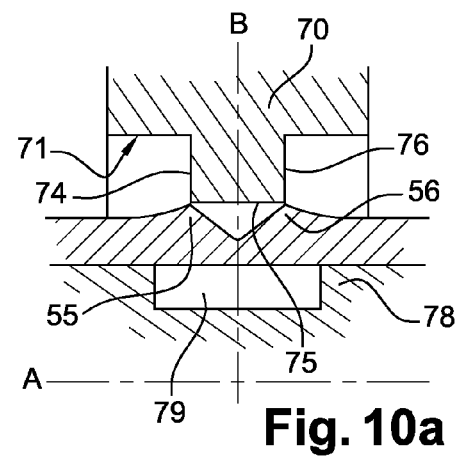
FIGS. 10a, 10b show schematic views of the production of a notch according to an implementation of the method of the invention.
Figure 10B:
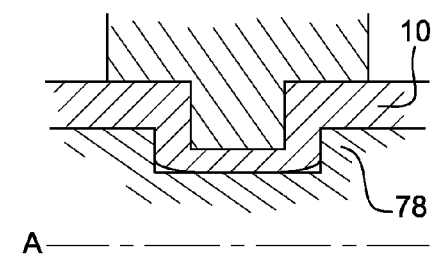

FIGS. 5, 10a, 10b show an implementation of the process in only two steps. The notch formed completely during the step ST2. The punching tooth 72 of the second punch 70 (FIG. 7) has a height (in the direction B) equal to the depth of the notch to be produced, the end 71 of the punch 70 has a shape complementary to the outer shape of the wall of the tube to be notched, in this case a hollow cylinder portion. FIG. 10a shows the position of the punch 70 when it arrives into contact with the area to be punched on the wall of the tube 10. The distance between the peaks of the protuberances 55, 56 is approximately equal to the width of the punching of the second punch. FIG. 10b shows the position of the punch at the end of punching: the inner transverse flanks of the notch are formed perfectly perpendicular to the axis of the tube, because the material was contained by the side faces of the tooth of the punch 70; thanks to the specific shape of the end 71 of the punch, the protuberances are completely removed and the wall of the tube returns to its original cylindrical shape; the edges of intersection between the flanks and the outer wall of the tube 10 are sharp; inside the tube 10, the material displaced by the punch is contained in the groove of the mandrel 78 and thus adopts the shape of said groove.

Figure 11A:
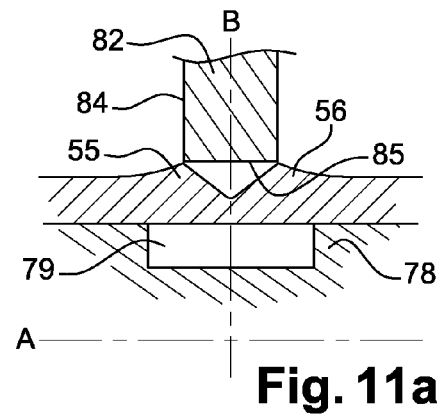
FIGS. 11a to 11d show schematic views of the production of a notch according to another implementation of the method of the invention.

FIGS. 5, 11a to 11d show an implementation of the process in three steps ST1 to ST3, permitting to produce notches having undercut flanks, slightly inclined with respect to the working plane. The step ST1 is similar to that of the previous example. The punch 80 (FIG. 8) used during the step ST2 has, here, one tooth 82, the height of which is larger than the height of the notch to be produced, so that the end 81 of the punch 80 does not enter into contact with the outer surface of the wall of the tube during the step ST2. FIG. 11a shows the position of the punch 80 when it arrives into contact with the area to be punched. The distance between the peaks of the protuberances 55, 56 is approximately equal to the width of the punching tooth 82 of the second punch. FIG. 10b shows the position of the punch at the end of step ST2: the flanks and the wall of the bottom of the notch are formed, but the protuberances 55, 56 have not been completely removed from the outer wall of the tube. The shape of the second punch has indeed been chosen so that the end of the second punch does not enter into contact with the wall of the tube and thus does not remove completely the protuberances 55, 56.

Figure 9:
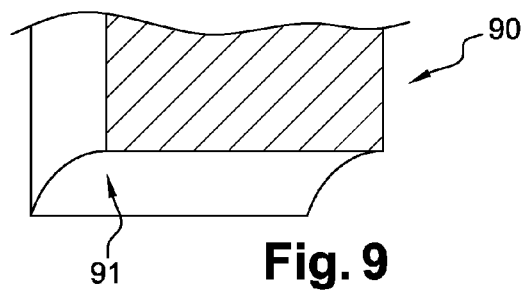
FIG. 9 is a perspective view of a third punch used in FIGS. 11c, 11d.
Figure 11B:
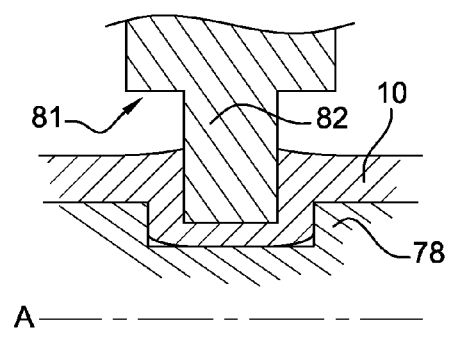
Figure 11C:
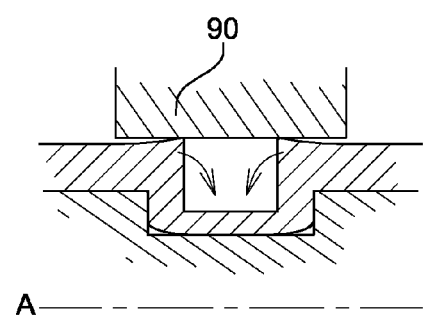
Figure 11D:
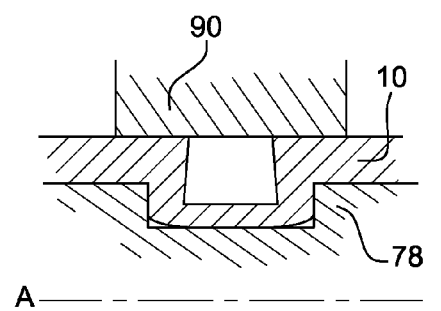

What remains of the protuberances 55, 56 is then removed during a third step ST3, during which a third punch 90 is guided in the working direction; the third punch 90 comprises an end 91 with a shape complementary to the outer shape of the wall of the tube to be notched: in the examples of FIGS. 9, 11c-d, a shape of a hollow cylindrical portion; the punch 90 comprises no tooth. Onto the punch is exerted a calibration force adapted for push inside the notch being formed the excess material pushed back during the step ST1, i.e. the material refluxed during the step ST1, but not "consumed" during the step ST2. FIG. 11c shows the position of the punch 80 when it enters into contact with the area to be punched on the tops of what remains of the protuberances. FIG. 11d shows the position of the punch 90 at the end of the punching (end of the step ST3): the end of the punch 91 is into contact with the outer surface of the wall of the tube 10, so that the protuberances 55, 56 are completely removed on the outer surface of the wall of the tube. The punch 90 has pushed inwardly the material contained in what remains of the protuberances of the notch (arrows in FIG. 11c), which space is free due to the absence of a tooth on the punch 90; this causes a slight inward inclination of the flanks of the notch formed during the step ST2. Since they are transverse, perfectly perpendicular to the axis of the tube at the end of the step ST2, the flanks of the notch are cambered, undercut at the end of the step ST3.

The method according to the invention can be implemented on a machine comprising:

a means for immobilizing a tube to be notched, while leaving free access to an area to be notched on an outer wall of the tube, and a means for positioning in the vicinity of the area to be notched, then for driving in translation along a working direction B concurrent with the longitudinal axis A of the tube and perpendicular to the longitudinal axis of the tube, successively a first punch 50, then a second punch 70, 80, and optionally a third punch 90.

An example of a means 30 for immobilizing the tube to be notched is shown in FIGS. 3a (open position) and 3b (closed position). It comprises a lower die 31, in the form of a half-shell, and an upper die 32 comprising two parts 32a, 32b in the form of a quarter-shell, which parts are movable in translation towards each other; the lower die is movable in translation towards the upper die; the inner shapes of the dies are adapted so that, when the dies are combined, the tube is immobilized inside the die. The means (a press, for example), not shown, carry out the relative movements of the two parts of the upper die, then of the lower die toward the upper die. In another example, not shown, the means 30 comprises a lower die and an upper die, each one of one single part.

The means 30 also ensures guiding of the punches through the die in the working direction B. To this end, in the example of FIGS. 3a, 3b, two grooves 34, 35 are formed respectively in each part 32a, 32b of the upper die, in order to form together, when the die is closed, the window for guiding a punch, which window extends in the working direction B. In the vicinity of the outside of the upper die 32, the guiding window has indeed the form of a body of the punches, i.e. in the example shown a square cross-section. On the other hand, in the vicinity of the inside of the die 32, the grooves 34, 35 are wider, deeper, thus leaving a free space for permitting to form protuberances 55, 56 during the step ST1. In another example, a pair of dies (a lower die and an upper die) is used for each punch, and the die is changed at each change of punch, i.e. at each step of the method. This permits to have at each step a die the guiding window of which has, at each step, the most suitable shape for holding the tube, for guiding the punch and for containing or not, locally, the material of the wall of the tube likely to be displaced during a step, in order to permit, on the one hand, the forming of the protuberances during the step ST1 and, on the other hand, to hold the material during the step ST2 or ST3.

The two or three punches are mounted for example on one and the same support (not shown) movable in translation, which, at each stage, positions the adequate punch above the die. A press, not shown, then drives in movement either one of the punches in the working direction B, with an adequate force depending on the step ST1, ST2 or ST3 to be performed.

Also, the two mandrels, the solid mandrel 58 and the mandrel with a groove 78, are for example mounted on one and the same support (not shown) movable in translation and in rotation, which, at each step, positions the appropriate mandrel inside the tube. A means, for example a cylinder, not shown, then drives the appropriate mandrel in translation or in rotation along the axis of the tube in the step ST1, ST2 or ST3 to be performed. In another example (not shown), the two mandrels are two parts of one and the mandrel movable in translation and in rotation and, at each step, a means such as a cylinder drives the mandrel in translation or in rotation along the axis of the tube, so as to position in the vicinity of the area to be notched the appropriate portion of the mandrel in the step ST1, ST2 or ST3 to be performed.

The mandrel with a groove 78 includes a groove with a shape similar to that of the notch to be produced, but with slightly larger width and height (see FIGS. 10a-10b and 11a-11d), so as to contain the material pushed back by the punches. The mandrel 78 also includes a longitudinal groove extending over the entire length of the mandrel, permitting to remove the mandrel from the tube after punching. In the embodiments shown, for producing a transverse notch, the longitudinal groove is straight along the axis A. After punching, the mandrel is driven in rotation along the axis of the tube, until the notch being produced is positioned in the groove, then the mandrel is driven in translation, in order to be removed. In another embodiment, for producing an inclined notch, for example the notch 13b of FIG. 2, the longitudinal groove comprises a helical portion and a straight portion. After punching, the mandrel is driven simultaneously in rotation and in translation along the helical portion, until the notch being produced is positioned in the straight portion of the groove; then the mandrel is driven in translation along the axis A, in order to be removed completely.

NOMENCLATURE

A longitudinal axis of the tube
B working direction of the punches
10 tube to be notched
11, 12 notch with a transverse flank and an inclined flank
13, 13a, 13b notches with two transverse flanks
30 means for immobilizing the tube and positioning the punches
31 lower die
32 upper die
32a, 32b two parts of the upper die
34, 35 grooves
41, 42 local saggings of the outer surface of the wall of the tube
50 first punch
51 end of the first punch
52 preforming tooth
53 leading end
55, 56 protuberances, material pushed back on both sides of the first punch 58 solid mandrel
70 second punch—first embodiment
71 end of the second punch
72 punching tooth
73 leading end of the punching tooth
74, 76 side faces of the end 73
75 leading face
78 mandrel
79 groove of the mandrel 78
80 second punch—second embodiment
81 end of the second punch
82 punching tooth
83 leading end of the punching tooth
84 side surface of the end 83
85 leading face
90 third punch two connecting rods 80, 90

I claim:

1. A method during which is produced, in an outer wall of a tube extending along a longitudinal axis, through guiding punches in a working plane and in a working direction concurrent with the longitudinal axis of the tube, at least one notch comprising at least one locking flank, the method comprising the following steps:

guiding a first punch in the working direction, a preforming tooth of the first punch extending from one end of the first punch and parallel to the working plane, an intersection of a leading end of the preforming tooth with the working plane forming a straight line, an intersection of said leading end of the preforming tooth with a plane parallel to the longitudinal axis of the tube forming a convex curve, exerting a preforming force onto the first punch so as to cause the preforming tooth to penetrate into the wall of the tube until obtaining a protuberance of material on both sides of the leading end of the preforming tooth, a solid cylindrical mandrel being positioned inside the tube, guiding a second punch in the working direction, a punching tooth of the second punch extending from one end of the second punch and parallel to the working plane, a leading end of the punching tooth having a shape complementary to a shape of the notch to be produced, and exerting a punching force on said second punch so as to cause the punching tooth to penetrate into the wall of the tube by a radial distance equal to the depth of the notch to be produced, a punching mandrel being positioned inside the tube, said punching mandrel having, near to a notching area, a groove containing a material displaced during the displacement of the second punch.

2. A method according to claim 1, wherein the leading end of the punching tooth comprises a leading face selected from one of a group consisting of:

a leading face connecting ends of a first side face parallel to the working plane and of a second side face inclined with respect to the working plane, and a leading face connecting the ends of two side faces parallel to the working plane.

3. A method according to claim 1, wherein a height of the punching tooth is equal to the depth of the notch to be produced, and wherein an end of the second punch has a shape complementary to an outer shape of the wall of the tube to be notched.

4. A method according to claim 1, wherein height of the punching tooth is larger than depth of the notch to be produced, the method, after the step ST2, further comprising the following step:

guiding a third punch in the working direction, the third punch comprising an end with a shape complementary to an outer shape of the wall of the tube to be notched, and exerting a calibration force on the third punch, in order to push into the interior of the notch being formed an excess material on the outer surface of the tube in the vicinity of the edges of the notch being formed.

5. A method according to claim 4, wherein the end of the second punch and the third punch has a hollow semi-cylindrical shape, complementary to the outer shape of the wall of the tube to be notched.

6. A method according to claim 1, wherein the intersection of the leading end of the preforming tooth with a plane parallel to the longitudinal axis of the tube forms a convex curve, said convex curve being one of a group consisting of:

V-shaped curve formed of two segments, the intersection of two segments forming a sharp edge, an arc of a circle, a parabola or a hyperbola, a U-shaped curve, a parabola, and a hyperbola.

* * * * *